United States Patent [19]

Flasck

[11] 4,332,466
[45] Jun. 1, 1982

[54] APPARATUS FOR PRODUCING MICROFORM RECORDS AT HIGH SPEED FROM COMPUTER OR OTHER ELECTRICAL DATA SIGNAL SOURCES

[75] Inventor: Richard Flasck, Rochester, Mich.

[73] Assignee: Energy Conversion Devices, Inc., Troy, Mich.

[21] Appl. No.: 113,579

[22] Filed: Jan. 21, 1980

[51] Int. Cl.³ .................. G03B 27/32; G03B 27/52
[52] U.S. Cl. ..................................... 355/27; 355/50
[58] Field of Search ............... 355/1, 27, 50, 51, 99, 355/100, 19, 54, 20

[56] References Cited

U.S. PATENT DOCUMENTS

| | | | |
|---|---|---|---|
| 3,598,490 | 8/1971 | Yearsley | 355/27 X |
| 3,741,651 | 6/1973 | Nishiyama et al. | 355/100 |
| 3,966,317 | 6/1976 | Wacks et al. | 355/19 |
| 4,123,157 | 10/1978 | Klose et al. | 355/54 X |
| 4,141,642 | 2/1979 | Nagai et al. | 355/1 |
| 4,174,174 | 11/1979 | Hunter, Jr. et al. | 355/54 |

Primary Examiner—Richard A. Wintercorn
Attorney, Agent, or Firm—Lawrence G. Norris

[57] ABSTRACT

Apparatus for producing microform records from computer stored data or other electrical data signal sources forms on the screen of a cathode ray tube at rapidly occuring intervals successive hard copy-appearing images of such data which is reduced in size by a bundle of tapered fiber optic filaments with a wide light receiving end encompassing the screen of the cathode ray tube and a narrow light projecting end encompassing an area of the frame of a microfiche card. The successively produced images at the narrow end of the fiber optic filament bundle are applied to successive frames of a heat developable masking film strip requiring more time to develop than the imaging intervals and moved in step-by-step fashion past the narrow end of the fiber optic bundle, a heating bar and an image transfer station where a flash of light is passed through the masking film strip to transfer a negative image thereon to a frame of an archival add-on microfiche card-forming film. The transfer of a cathode ray tube image to the masking film, the application of a heating bar to a previously imaged frame of the masking strip and the transfer of a previously imaged portion of the masking film may take place simultaneously. The heating bar has a length several frame lengths long so that a frame of the masking film is completely developed over several imaging intervals.

10 Claims, 5 Drawing Figures

APPARATUS FOR PRODUCING MICROFORM RECORDS AT HIGH SPEED FROM COMPUTER OR OTHER ELECTRICAL DATA SIGNAL SOURCES

BACKGROUND OF INVENTION

The present invention in one of its forms relates to a dry-process apparatus for producing archival microform records of computer stored data or other electrical signal data sources. The apparatus in some respects is similar to that disclosed in U.S. Pat. Nos. 3,966,317 and 4,123,157, but is different therefrom in its most preferred form in that it produces microform records from hard copy-appearing images on a cathode ray tube screen rather than from hard copy directly, and at a much higher speed of operation made possible by the use of a tapered fiber optic filament bundle and by the manner in which the masking film strip is supported and advanced past the various stations of the apparatus. The apparatus disclosed in these patents includes an imaging station wherein a light image reflected from the hard copy is reduced through a mirror and lens system to micro-image size and applied to a heat developable dry-process masking film strip, like one made of a dry silver film, which is photosensitive to and imaged by the light reflected from the hard copy and which is developed by heat to provide micro-imaged transparencies therein where the light preferably forms a dark opaque background for transparent data-forming portions of the image produced therein. The heat application times necessary to develop such films generally take a number of seconds. The apparatus also includes an image transfer station where the micro-image records of the transparencies produced in the masking film strip are transferred by radiant energy above a certain critical value passing therethrough to an initially opaque archival dry-process microfiche card-forming film which is not very sensitive to hard copy reflected light, but is sensitive to and made transparent without any developing in those regions thereof struck by the radiant energy above the certain critical value. The final image thus produced is a negative of the original hard copy image and has archival properties. Since only the originally dark data-indicating portion of the original hard copy image affects the microfiche card-forming film, the film has add-on capabilities. The apparatus disclosed in said U.S. Pat. No. 4,123,157 includes features for enabling a previously partially imaged frame of the microfiche card-forming film to be moved into a projection position where the frame image is projected onto the platform so that an overlay piece of hard copy can be placed on the platform and positioned thereon to transfer data thereon to still unimaged portions of the microfiche frame involved.

It was not initially appreciated that the apparatus as disclosed in the aforesaid patents could be effectively used in recording information fed directly from cathode ray tube images. In the past, microform records have sometimes been made from computer data by using a computer data controlled laser beam scanning small areas of a recording film to provide micro-sized characters representing alpha-numeric and other data. However, laser beam scanning equipment designed for this purpose is relatively expensive, and because of OSHA restrictions are not presently useable in business offices and the like. Also, cathode ray tube images where the alpha-numeric data is directly formed by the lighted portions of the cathode ray tube screen have been reduced in size and applied to a film to form microform images thereon. The microform film used did not have add-on capabilities, and there was probably no particular thought given to the advantages of providing alpha-numeric data formed by back-lighted portions of the cathode ray tube screen which form dark alpha-numeric characters or other data.

SUMMARY OF THE INVENTION

In accordance with one of the features of the present invention, to avoid the need for complex, expensive and restricted use laser scanning microform record-producing apparatus, electrical signal data is fed to a cathode ray tube or the like, and the image produced on the face of the cathode ray tube, in turn, is reduced by an image-reduction projection system comprising a bundle of tapering fiber-optic filaments encompassing the screen of a cathode ray tube at one end thereof and occupying an area at the other end thereof which encompasses only a frame of a microfiche card. The advantage of a fiber optic bundle in comparison, for example, to an image-reducing projection system comprising mirrors and lenses is that there is practically no loss of light through a fiber optic bundle projection system, unlike the substantial light losses inherent in a lens projection system, and the concentration of light at the small end of the fiber optic bundle enables images to be made on a film like dry silver in a fraction of a second, as compared to two or more seconds necessary using a light projection system like that disclosed in said patents. It is not believed that it has been heretofore considered to use a fiber optic bundle having a tapering cross section for the purpose of reducing hard copy-appearing images on the screen of the cathode ray tube to the size of a frame of a microfiche card and in a manner to be described where the speed of making microform records from such images can be the order of not much more than about 1 second rather than several seconds.

In accordance with another aspect of the invention, in order to take advantage of the short exposure times made possible with the use of a tapered fiber optic filament bundle as described in a microform recording system where the images are made on a film like dry silver film where developing times require several seconds, the imaging station of the masking film is separated from the heat developing station therefor. The strip of masking film, which is preferably unwound from a supply reel, fed to a take-up reel and advanced in step-by-step fashion one frame distance after each exposure of the masking film, is moved past a developing station preferably including a heating bar which has a heating surface of a length equal to a number of frames of the masking film so that, as the masking film is moved in steps past the heating bar, the heating bar will have a contact time necessary to fully develop the images previously applied to the film. For example, if the developing time is 4 seconds and the heating bar is moved each cycle into contact with the film for 4/5 of a second each time an image is made on the imaging film at the masking station, the heating bar must be 5 frames long. Simultaneously with each imaging of the masking film at the imaging station and the bringing of the heating bar against the masking film, a previously heat developed frame of information may be transferred to the microfiche card-forming film. With this arrangement of imaging, developing and image transfer stations, it can be seen that the microform records can be formed of the data involved displayed on the screen of a cathode ray tube at a rate of approximately one second or less per frame.

The CRT image microform producing operation can be either manually initiated or automatically initiated by the data source involved, so that spaced frames of information of the stored data can be produced on microfiche card-forming film at locations determined by the computer on successive frames or widely spaced frames of the microfiche card, or on manually selected frames thereof. Also, for completely automatic operation, it is most advantageous that the microfiche card-forming film constitutes either stacked cards each of which can be automatically fed into an imaging position when a card has been completely imaged, or a roll of such film where longitudinally spaced sections thereof can form individual microfiche cards when severed from the rest of the roll. Such a roll of microfiche card-forming film can, for example, be supported in a cassette mounted on a X-Y positioning carriage. In the cassette the film unwinds from a supply reel onto a take-up reel, and between the two reels the film strip forms a card-forming segment of the film which encompasses an area of one microfiche film card with many rows of frames. The cassette carriage is moved into different X and Y axis positions to bring a new frame of a card-forming segment of the roll of film into an exposed image-receiving position automatically as an image is formed in a frame thereof. A carriage position sensor may be provided to determine when the particular frame of the exposed card-forming segment in position for imaging is the last frame of the card-forming segment, so that a roll feeding operation can be initiated to bring another card-forming segment into imaging position after such last frame is exposed.

The above described and other features of the invention will be more completely described and more clearly understood upon making reference to the specification to follow and the drawings.

DESCRIPTION OF EXEMPLARY FORMS OF INVENTION SHOWN IN THE DRAWINGS

Figure 1:
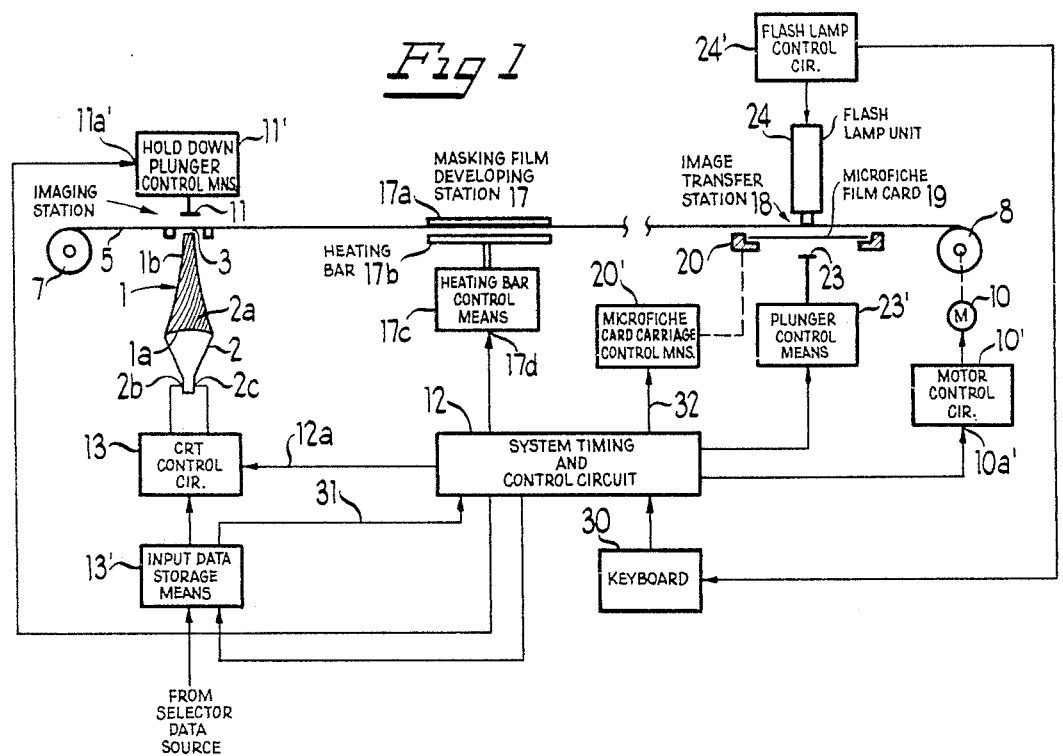
FIG. 1 is a partially simplified block diagram of a microfiche card recording system comprising a cathode ray tube and a tapered fiber optic filament bundle which reduces the image on the screen of the cathode ray tube to one of a size approximating the frame of a microfiche card, and includes therein various basic elements for making a practical high speed microfiche card recording system for computer stored or other data displayed as pages of information in sequence on the face of the cathode ray tube.
Figure 2:
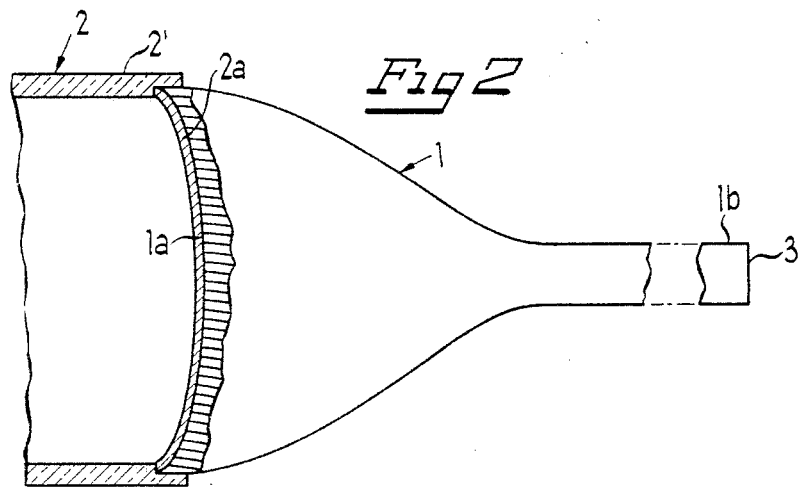
FIG. 2 illustrates one exemplary way in which a bundle of tapered fiber optic filaments can be physically integrated with a cathode ray tube.
Figure 3:
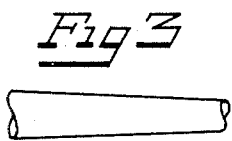
FIG. 3 is a sectional view through a portion of the tapered fiber optic bundle shown in FIGS. 1 and 2 and shows the tapering of a filament or a small bundle of filaments making up a small portion of the bundle shown in FIG. 2.

While the control circuit details of the exemplary preferred form of the microfiche card recording system of the invention to be described can vary widely, it may have the basic circuit logic and other details shown in FIG. 1, to which reference should now be made. FIG. 1 shows the invention applied to an apparatus for producing microform records similar in only some respects to that shown in said U.S. Pat. No. 4,123,157. One major difference is that the apparatus shown in FIG. 1 includes a tapered fiber optic filament bundle 1 having a concave wide end face 1a to which is applied a layer 2a of a phosphorescent screen material to be struck by an electron beam produced and deflected in a conventional way by a cathode ray tube 2. The cathode ray tube 2 may be of conventional form except that the forward end of the envelope portion 2' thereof is open and so devoid of the usual front transparent envelope wall to which is usually applied a coating of the phosphorescent screen material. Instead, the envelope portion 2' is designed sealingly to receive the phosphorescent screen coated wide front end portion of the tapered fiber optic filament bundle 1. In order to eliminate image distortion, it is imperative that there be no appreciable thickness of glass and other material between the screen 2a or bundle 1 which would disperse the image which is developed on the screen 2a.

The bundle 1 may be made in a well known manner where it comprises hundreds of tiny fiber optic filaments fabricated in a way to maximize internal light reflection and compacted together and encapsulated with a suitable potting material forming a monolithic unit. Such a unit is heated and stretched out to taper the entire unit to form a narrow flat end 1b which approximates the size of a microfiche card frame. The light image which appears on the screen 2a is reduced in size by the tapering of the fiber optic filaments of the bundle 1. Also, it is preferred that the narrow end 1b of the bundle has a flat face 3. This flat face 3 confronts a frame of a masking film strip 5 at an imaging station 6. The film is preferably a heat developable film, like dry silver which usually takes a number of seconds to develop when heat at a temperature which will not damage the film is applied thereto. The masking film strip 5 extends between a supply reel 7 and a motor-driven take-up reel 8 between which are located the imaging station 6 and developing and image transfer stations 17 and 18. A motor 10 is shown coupled to the take-up reel 8, the motor, in turn, being controlled by a motor control circuit 10' which advances the film strip in step-by-step fashion. The motor control circuit 10' is shown with its input 10a' controlled by an output of a system timing and control circuit 12.

Mounted on the opposite side of the masking film strip 5 from the flat end of the bundle 1 at the imaging station 6 is a hold-down plunger 11, in turn, controlled by a hold-down plunger control means 11', which may be a solenoid or the like. When it is desired to record an image appearing on the flat end of the bundle 1 during the dwell in the movement of the film strip 5, the solenoid or other control means 11' is energized momentarily to bring the hold-down plunger 11 against the portion of the masking film strip at the imaging station 6 to push the same against the flat end of the bundle 1 where the film is exposed to the image produced at the narrow end 1b of the bundle 1. The imaging time during which the masking film strip is exposed to this light image may be varied by varying the length of time the hold-down plunger 11 presses the film 5 against the flat end of the bundle 1. However, this exposure timing is preferably effected by controlling the time the light image appears on the screen 2a of the cathode ray tube 2. Because of the use of a light concentrating fiber optic filament bundle 1, exposure times of less than a second are required using conventional dry silver films. The hold-down plunger control means 11' is shown having its input 11a' connected to an output of a system timing and control circuit 12. Deflection and intensity signal input terminals 2b and 2c of the cathode ray tube unit 2 are shown controlled by the output from a CRT control circuit 13, in turn, receiving electrical control signals from an input data storage means which receives electrical data signals from a computer or other electrical signal data source. The timing of the feeding of information from the CRT control circuit 13 to the deflection and intensity control terminals 2b and 2c is controlled by signals on one or more signal lines 12a extending between the system timing and control circuit 12 to the CRT control circuit 13. These signals preferably produce on the screen 2a an image duplicating hard copy, that is a lighted background framing dark alpha-numeric characters or lines forming a curve or picture. The system timing control circuit 12 sends appropriate signals to the motor control circuit 10' after an image has been recorded on a frame of the masking film strip 5 at the imaging station 6 so as to advance the position of the masking film strip 5 one frame distance, to bring a previously unimaged portion of the masking film strip 5 opposite the imaging station 6 for an imaging operation as just described.

The imaged frames on the masking film strip 5 are moved past masking film developing station 17 which may take a number of forms. As illustrated, it includes a backing plate 17a and a heating bar 17b movable between positions spaced from the backing plate 17a to a position contiguous thereto where it presses the portion of the film strip 5 passing thereby against the backing plate 17a for a predetermined period during each cycle. The movement of the heating bar 17b is controlled by a heating bar control means 17c which may be a solenoid having an input 17d extending from the system timing and control circuit 12. Thus, during each recording cycle at the imaging station 6, a previously imaged portion of the film strip 5 is also moved opposite the masking film developing station 17 and system timing and control circuit 12 feeds a control pulse to the input 17d of the heating bar control means 17c to cause the heating bar 17b momentarily to press the portions of the film strip 5 located thereat against the backing plate 17a. As previously indicated, the time for exposing the film strip 5 can be a fraction of a second whereas it will normally take several seconds to effect the full heat development of the image on the film strip. However, the normal timing between successive film advancement steps is preferably about one second. The backing plate 17a and the heating bar 17b are shown having a length encompassing several frames of the film strip 5 so that it is apparent that in a number of successive step-by-step movements of the film strip 5 and back and forth movements of the heating bar 17b the film strip will receive a sufficient number of momentary applications of heat from the heating bar 17b to fully image the film.

In other words, the length of the backing plate 17a and the heating bar 17b are selected so that the accumulated amount of time that the heating bar 17b makes contact with the masking film strip will be sufficient to effect proper development of the film strip.

After the imaged portions of the film strip 5 have been moved passed the masking film developing station 17 they are subsequently moved opposite the image transfer station 18. Thus, simultaneously with an imaging operation at the imaging station 6 and a partial developing operation at the developing station, there will be an image transfer operation at the image transfer station 18 where the image on a film strip frame is transferred to a frame of a microfiche film card 19 supported on a carriage 20. The position of the microfiche film card carriage 20 is controlled by a carriage position control means 20' which receives signals from the system timing and control circuit 12. Mounted beneath the microfiche film card carriage 20 is a plunger 23 controlled by a plunger control means 23' which may be a solenoid which, when energized momentarily, will bring the plunger 23 against a selected frame of the microfiche film card 19 in position for imaging to press the same against the mask-forming film, in turn, braced by a suitable backing which could be a part of a flash lamp unit 24. When the plunger 23 is thus positioned, a flash control circuit 24' will operate flash lamp unit 24 which may include a Xenon lamp to provide a flash of light to transfer the image on the film strip 5 to the frame of the microfiche film card on the carriage 20 in position for imaging. There may be at the image and developing station suitable position sensors to be described in connection with FIG. 4 which sensors automatically effect movement of the carriage 20 when a row of frames on the card 19 has been imaged so that a frame at the beginning of a new row of frames is brought into image position. However, the initial position of the microfiche film card 19 may be determined by operation of microfiche frame identifying keys on a keyboard 30, or when microfiche frame address signals are generated by the data storage means 13' on groups of control lines collectively identified by reference numeral 31 extending to the system timing and control circuit which, in turn, generates control signals on control lines 32 extending to the carriage control means 20'. As previously indicated, the microfiche card recording system shown forms microform images on various frames of the microfiche film card 19 from data page images sequentially produced on the screen 2a of the cathode ray tube 2. The means for feeding images sequentially to the cathode ray tube 2 from any selected electrical signal data source is well known in the art (although the prior art has not incorporated the same into a microform imaging system as shown and described). These data sources feed this information one data page at a time either automatically or under manual control. In either event, these signal sources feed data to be converted into alpha-numeric, picture or curve producing form first to the input data storage means 13'.

Figure 4:
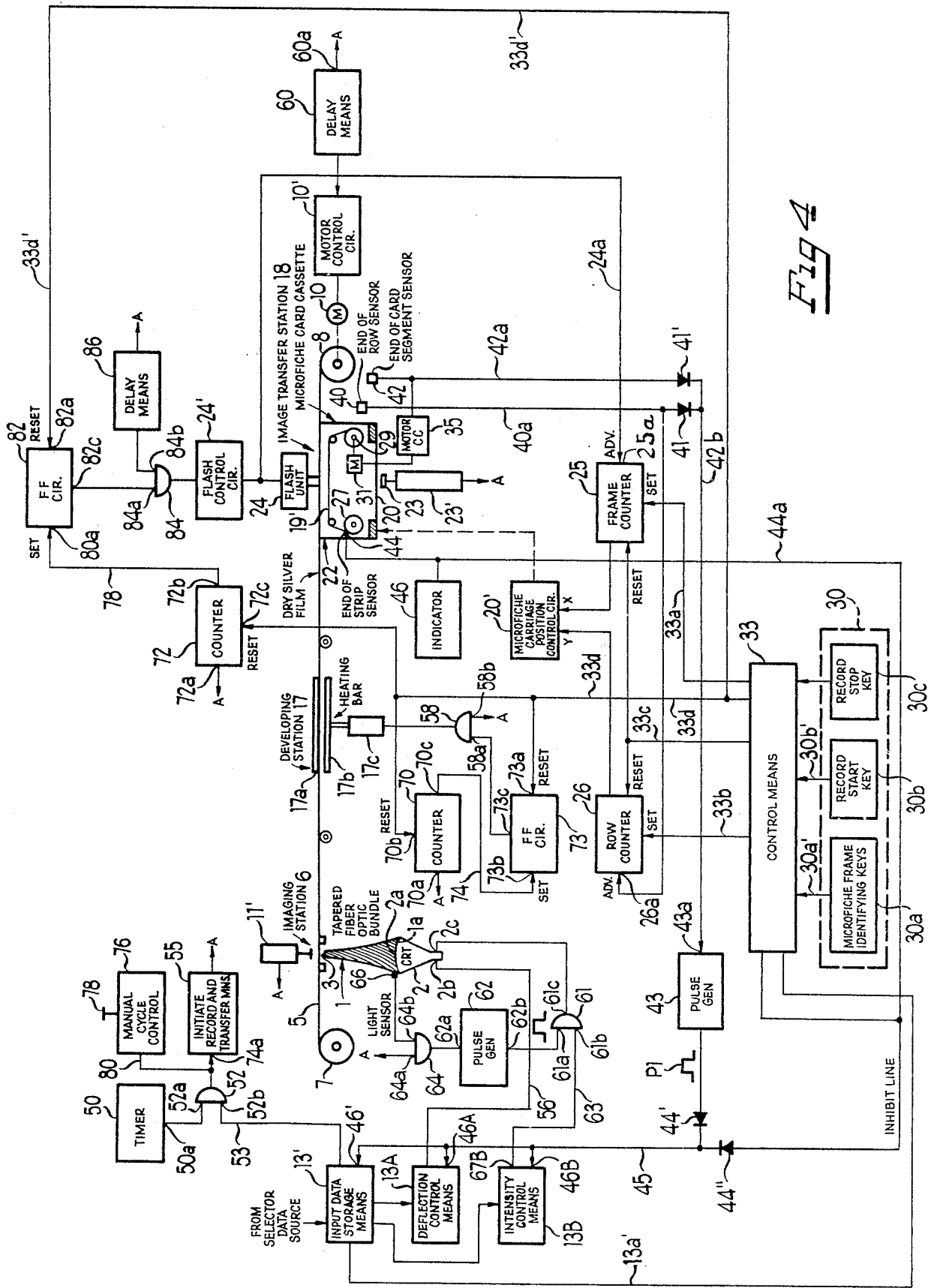
FIG. 4 is a detailed block diagram showing a preferred form of microfiche card recording system of the invention of FIG. 1.

The present invention is adapted for automatic recording of large masses of data fed from a computer or another data source. Obviously, the frames encompassed in a single microfiche film card can be rapidly used up, and so there should be some means for automatically feeding either additional microfiche film cards into position for imaging on the carriage 20 or each microfiche film card forms a segment of a relatively large strip 19' of microfiche film-forming material to be supported between supply and take-up reels 27 and 29 in a cassette 22 shown in FIG. 4 to which reference should now be made. As previously indicated, FIG. 4 shows a preferred detail block diagram of a microfiche card recording system as described.

Microfiche frame identifying key means 30a, record-start key means 30b and record-stop key means 30c are provided on keyboard 30. When the record-start key means 30b is operated, a signal produced on control line 30b' extending to control means 33 results in a resetting pulse generated on a reset line 33c extending to the reset inputs of row and frame counters 26 and 25 to reset the same to one. When the microfiche frame identifying key means 30a are depressed, or when microfiche frame address signals are generated by data storage means 13', groups of control lines collectively identified by reference numeral 30a' or 13a' extending to (microprocessor) control means 33 receive signals which effect the generation of control signals on control lines 33a and 33b respectively extending to the set inputs of frame and row counters 25 and 26 which enter therein the microfiche film card frame and row identifying indicia of the keys depressed. The frame and row counters 25 and 26 are respectively connected to the X and Y inputs of the carriage position control circuit 20' which effects the movement of the microfiche card carriage 20 into a position to bring the selected frame into image transferring position below the flash unit 24. The frame counter 25 has an advance input terminal 25a to which extends line 24a connected to the output of the flash control circuit 24' so that the frame number stored in the frame counter increases by one digit automatically each time a new image is recorded on a microfiche film card segment. The frame counter 25 is reset to number one when the last frame in any row receives an image thereon.

Figure 5:
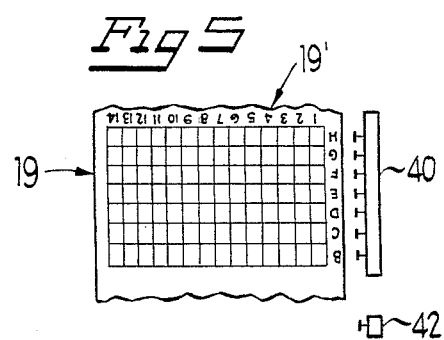
FIG. 5 illustrates a microfiche card-forming segment of a film strip in the cassette shown in FIG. 4 and shows various sensors which are operated when the cassette is moved from positions where the end of a row or end of the last row of the card-forming segment are in position to receive an image.

Similarly, the row counter 26 has an advance input terminal 26a to which extends a control line 40a connected to an end of row sensor 40. After the last frame in a row of the microfiche card segment is imaged, the end of the row sensor 40 will be operated to advance the indicia in the row counter one row position, so that the next recording operation will take place in the first frame of the next row, unless a different frame number is set-up by the microfiche frame identifying key means 30a. To this end, when the carriage 20 is moved from a position where the last row of a row of frames of the microfiche card forming segment 19 of the film strip 19' (FIGS. 4 and 5) is in an imaging position, the sensor 40 is operated to generate a signal on a line 40a which feeds the signal through an isolating rectifier 41 and a line 42b to the input terminal 43a of a pulse generator 43, which may be a one shot multivibrator which responds thereto by producing a record inhibiting pulse P1 of a given width. This pulse, in turn, is fed through an isolating rectifier 44' to an inhibiting line 45 extending to inhibiting inputs 46', 46A and 46B, respectively, of data storage means 13; deflection control means 13A and intensity control means 13B. These inhibiting pulses prevent any feeding of information to the cathode ray tube 2 until the carriage positioning control circuit 20' has effected the movement of the carriage 20 into a position where the exposed microfiche film card-forming segment 19 is in a position where the first frame of the next row of frames is in position to receive an image. (If this movement can take place in a fraction of a second, it is not necessary to inhibit the feeding of information to the cathode ray tube 2.)

There is also provided at the image transfer station 18 an end of card segment sensor 42 which is operated when the carriage 20 is moved from a position where the last frame in the last row of frames of the exposed microfiche film strip segment is in imaging position. The end of card sensor 42 produces a signal on a control line 42a which is fed through an isolating diode 41' to the line 42b extending to the input 43a of the pulse generator 43, to produce a pulse P1 for inhibiting again the feeding of information to the cathode ray tube 2 for a sufficient period to enable a new microfiche card-forming segment 19 to be moved into a position for imaging. To this end, the control line 42a from the end of card segment sensor 42 is connected to a motor control circuit 35 controlling a motor 31 coupled to the take-up reel 29 in cassette 22. The feeding of such a control signal to circuit 35 will energize the motor for a sufficient time to advance the film strip 19' one full segment. When the motor 31 moves the film strip 19' to the very end thereof, an end of strip sensor 44 is operated, as by a magnetized section of the film strip 19' sensed by a magnetic sensing means constituting the sensor 44, to generate a control signal on a line 44a extending to a suitable annunciator or indicator 46, to alert the operator that a new cassette should be placed into position. The control line 44a also extends to an isolating rectifier 44" which feeds continuous control signals on the inhibit line 45 to continue to inhibit any further feeding of information to the cathode ray tube until the used cartridge 22 has been replaced by a new cartridge.

In the high speed application of the invention where, for example, a normal basic image, developing and image transfer cycle takes about one second, except during the inhibiting operations described, the microfiche card recording system preferably operates from a timer 50 which produces timing pulses spaced apart the basic timing period, like one second. The pulses produced by this timer 50 appear on an output line 50a extending to an input 52a of an "AND" gate 52. This "AND" gate 52 has another input 52b fed by a control line 53 extending from the data storage means 13' which feeds an enabling signal to the input terminal 52b of AND gate 52 when information is to be transferred to the cathode ray tube 2 and an image on the screen thereof is to be recorded on the masking film strip 5. Thus, when the aforementioned inhibiting signals are fed to the inhibiting input 46' of the data storage means 13', no such enabling signal will be generated.

The output of the "AND" gate 52 is coupled to the input of an initiate record and transfer means 55 which generates cycle initiating and operating signals on one or more timing lines A. These timing lines extend to and control the hold down plunger solenoid 11', heating bar solenoid 17c, input 58b of "AND" gate 58, and input 60a of a suitable delay means 60 which delays the signal on a timing line A for a sufficient time like ¾ of a second to permit the aforementioned imaging, developing and image transfer operations to take place before motor 10 is momentarily by means of motor control circuit 10' to advance the masking film strip 5 by one frame.

A timing line A also extends to the input 64a of an "AND" gate 64 whose other input 64b extends to a light sensor 66 which senses the background light intensity produced by the electron beam scanning the cathode ray tube screen 2a. When the "AND" gate 64 is open for a momentary period, the signal from the light sensor 66 is fed to the input 62a of a pulse generator 62 which produces a pulse at the output terminal 62b thereof which has a width inversely proportional to the intensity of the light detected by the light sensor 66. This pulse is fed to an input 61a of an "AND" gate 61 which has another input 61b connected by a line 63 to an output 67B of the intensity control means 13B. When an inhibiting signal is fed to the inhibiting input 46B of the intensity control means 13B, signals normally appearing at the output 67B will disappear to prevent the feeding of the output of pulse generator 62 through the "AND" gate 61. The "AND" gate 61 has an output 61c extending to the intensity control terminal 2c of the cathode ray tube 2. It is thus apparent that the length of time an image will appear on the screen of the cathode ray tube 2 is controlled by the background light intensity of the screen of the cathode ray tube.

In order to avoid the wasting of frames on the masking film strip 5 and on the microfiche film card involved developing and image transfer operations are inhibited until an imaged portion of masking film strip 5 is brought to a developing or image transfer position. To this end, pulse counters 70 and 72 are provided which have pulse inputs 70a and 72a extending to a timing line A. The initiation of a pulse at the beginning of each recording cycle will advance the count of counters 70 and 72 by one. These counters are reset by the operation of the record start key means 30b and so a control line 30b' extends between the record start key means 30b and the control means 33', so that operation of the key means 30b will effect the feeding of a pulse on a control line 33d extending to the reset inputs 70b and 72c" of the counters 70 and 72, respectively. This reset control line 33d also extends to the reset input 73a of a flip-flop circuit 73 having a set input 73b coupled to a control line 74 extending from the output 70c of the counter 70. The flip-flop circuit 73 is set into a state which produces an output signal on output 73c of the flip-flop circuit 73 when the counter 70 has reached a count which shows that the first imaged section on the masking film strip 5 has reached the inlet portion of the backing plate 17a at the developing station 17, when it is desired to initiate a developing operation on this first imaged frame. The output 73c of the flip-flop circuit 73 is coupled to an input 58a of the "AND" gate 58, the output of which is connected to the heating bar solenoid 17c, so that when the first imaged frame reaches the backing plate 17a, the cycle initiating pulse appearing on the timing line A which is connected to the input 58b of "AND" gate 58 will be instrumental in momentarily moving the heating bar against the masking film strip 5.

The counter 72 controls the initiation of the image transfer operation previously described. Accordingly, when the count in the counter 72 reaches a count indicating that the first imaged portion of the masking film strip 5 has reached the image transfer station 18, a control signal appears at the counter output 72b which is fed through a control line 78 to the set input 80a of flip-flop circuit 82. The flip-flop circuit 82 is reset by a control signal fed to its reset input 82a by a reset line 33d' connected with the previously mentioned reset line 33d which receives a reset signal when the record start key means is operated.

The flip-flop circuit 82 has an output 82c at which appears a control signal when the flip-flop circuit is in a set condition, which produces an enabling signal fed to the input 84a of an "AND" gate 84 whose other input 84b extends through a delay means 86 to a timing line A. The presence of a cycle initiating signal on its timing line A will cause the plunger solenoid 23' to be energized to move the plunger 23 into a position where the microfiche card-forming film strip 19' is pushed against the masking film strip 5 at the image transfer station 18. Then, the delay means 86 feeds an enabling pulse to the input 84b of the "AND" gate 84 which opens to couple the output of flip-flop circuit 82 to flash control circuit 24'.

The microfiche recording system described up to this point operates automatically under control of the timer 50 when data signals are continuously fed to the data storage means 13' and in the absence of any inhibiting signals fed to the inhibiting means 46', 46A and 46B of the data storage means, deflection control means 13A and intensity control means 13B. In the absence of any data stored in data storage means 13', the data storage means 13' will not feed an enabling signal on the line 53 extending to the "AND" gate 52, so that the pulses generated by the timer 50 will have no effect in carrying out wasted imaging operations. However, it may be that the operator of the equipment desires to replace the cassette 22 with a new cassette and to transfer all of the imaged portions of the masking film strip 5 not yet developed or transferred to the exposed microfiche card-forming segment 19 of the film strip 19' in the cassette 22. To this end, a manual cycle control means 76 is provided with a manually operable control 78 which, when operated, will generate a sufficient number of timing pulses fed, through output 80 to the initiate record and transfer means 55 to effect successive cycles of operation of the recording apparatus to bring the imaged but undeveloped frame of the masking film strip 5 opposite the imaging station 6 in a developed state to the image transfer station 18 where it is transferred to the film strip 19'.

The present invention as described has provided a reliable, high speed microfiche card recording system. However, it should be understood that numerous modifications may be made in the most preferred forms of the invention described without deviating from the broader aspects of the invention.

I claim:

1. In apparatus for producing records of data and including an imaging station, means for sequentially providing light images representing different pages of recorded data to be recorded, a film strip having spaced frame areas which are to be initially imaged by said light images at said imaging station, said film strip also requiring development to bring out an image projected thereon, a developing station including developing means for developing said film strip in incremental degrees depending upon the time of application thereof to said film strip, the improvement comprising: means supporting said film strip between supply and take-up means, said film strip between said supply and take-up means extending past said imaging station and developing station; image projection means at said imaging station which projects said light images upon successive frame area of said film strip with exposure times substantially less than the developing time required to develop an image on said film strip; control means for simultaneously effecting the projection of one of said light images through said projection means upon a frame area of said film strip at said imaging station while a previously exposed frame area of said film strip is being developed at said developing station; and means for moving said film strip between said supply and take-up means in step-by-step fashion simultaneously to bring a previously unexposed frame area of said film strip to said imaging station and an exposed but undeveloped frame areas of said film strip to said developing station at a speed wherein the time duration between successive stepping operations is substantially less than that required to develop said film strip at the developing station, said developing means at said developing station having a length encompassing a sufficient number of frame areas of said film strip that the film strip is exposed to said developing means for a sufficient time fully to develop the image therein during successive imaging and developing operations applied to said film strip.

2. In apparatus for producing microform records of data and including an imaging station, means for sequentially providing light images representing different pages of recorded data to be recorded, a film strip having spaced frame areas which are to be initially imaged by said light images at said light imaging station, said film strip also requiring development to bring out an image projected thereon, a developing station including developing means for developing said film strip in incremental degrees depending upon the time of application thereof to said film strip, a permanent record film much less sensitive to said light images than said film strip and upon which pages of data transferred from said film strip are to be recorded at an image transfer station in small spaced frame areas thereof, and an image transfer station including image transfer means for transferring a developed image on said film strip to a selected frame area of said permanent record film, the improvement comprising: means supporting said film strip between supply and take-up means, said film strip between said supply and take-up means extending past said imaging station, developing station and image transfer station; image projection means at said imaging station which projects said light images upon successive frame areas of said film strip with exposure times substantially less than the developing time required to develop an image on said film strip; control means for simultaneously effecting the projection of one of said light images through said projection means upon a frame area of said film strip at said imaging station while a previously exposed frame area of said film strip is being developed at said developing station; and means for moving said film strip between said supply and take-up means in step-by-step fashion to bring a previously unexposed frame area of said film strip to said imaging station and exposed but undeveloped frame area of said film strip to said developing station and previously developed frame areas of said film strip to said image transfer station at a speed wherein the time duration between successive stepping operations is substantially less than that required to develop said film strip at the developing station, said developing means at said developing station having a length encompassing a sufficient number of frame areas of said film strip that the film strip is exposed to said developing means for a sufficient time fully to develop the image therein during successive imaging and developing operations applied to said film strip.

3. The apparatus of claim 2 wherein said control means simultaneously operates said image transfer means at said image transfer station to transfer an image of a previously developed frame area of said film strip to a selected frame area of said permanent record film simultaneously with the exposure of said film strip to a light image through said projection means at said imaging station and the developing of a previously imaged frame area of said film strip at said developing station.

4. The apparatus of claim 1 wherein said means for providing successive light images includes a display device having a screen upon which is produced light image-forming areas in response to data image-forming signals fed to input terminals thereof.

5. The apparatus of claim 4 wherein said image projection means is a fiber optic filament bundle having tapered filaments which define a relatively wide end of the bundle contiguous to the screen of said display device and a relatively narrow opposite end encompassing the size of a frame of said permanent record film so that a greatly reduced image is produced on said film strip.

6. The apparatus of claim 5 wherein said display device is a cathode ray tube.

7. The apparatus of claim 2 wherein said means for providing said successive light images is a display device having a screen upon which is produced light image-forming areas in response to data image-forming signals fed to input terminals thereof.

8. The apparatus of claim 4 or 7 wherein said data image-forming signals produce back-lighted areas on said screen which define dark alpha-numeric or other data-producing areas on said screen so that the light images on said screen have the appearance of hard copy.

9. The apparatus of claim 7 wherein said data image-forming signals produce back-lighted areas on said screen which define dark alpha-numeric or other data-producing areas on said screen so that the light images on said screen have the appearance of hard copy, and said film strip is a masking film producing, when developed, opaque areas where exposed to light and transparent areas where not exposed to light, said image transfer station including means for projecting light through a developed frame area of said film strip upon said permanent record film, said permanent record film being initially opaque and portions thereof struck by light projected through transparent areas of said film strip being converted to transparent areas so that other unexposed areas thereof can be subsequently imaged.

10. The apparatus of claim 4 or 7 wherein said means for providing successive light images includes a cathode ray tube with which is integrated a fiber optic filament bundle applied immediately adjacent to the screen of said display device.

* * * * *

UNITED STATES PATENT AND TRADEMARK OFFICE
CERTIFICATE OF CORRECTION

PATENT NO. : 4,332,466
DATED : June 1, 1982
INVENTOR(S) : Richard A. Flasck

It is certified that error appears in the above—identified patent and that said Letters Patent is hereby corrected as shown below:

Column 4, line 29, "and" should read --or--.
Column 4, line 30, "or" should read --and--.
Column 8, line 60, --energized-- should be inserted after "momentarily".

Signed and Sealed this

Seventeenth Day of August 1982

[SEAL]

Attest:

GERALD J. MOSSINGHOFF

Attesting Officer    Commissioner of Patents and Trademarks